(12) United States Patent
Squires et al.

(10) Patent No.: US 9,073,187 B2
(45) Date of Patent: *Jul. 7, 2015

(54) CABLE TENSIONING DEVICE

(71) Applicant: Hurricane Safety Systems, LLC, Traverse City, MI (US)

(72) Inventors: Timothy P. Squires, Williamsburg, MI (US); Ronald J. Hanna, East Jordan, MI (US); Kenneth Lamb, Kingsley, MI (US)

(73) Assignee: Hurricane Safety Systems, LLC, Traverse City, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/667,536

(22) Filed: Nov. 2, 2012

(65) Prior Publication Data

US 2013/0111715 A1    May 9, 2013

Related U.S. Application Data

(60) Provisional application No. 61/555,608, filed on Nov. 4, 2011.

(51) Int. Cl.
    *B60P 3/079* (2006.01)
    *B25B 25/00* (2006.01)
    *B60P 7/08* (2006.01)

(52) U.S. Cl.
    CPC .......... *B25B 25/00* (2013.01); *Y10T 24/2175* (2015.01); *B60P 3/079* (2013.01); *B60P 7/083* (2013.01)

(58) Field of Classification Search
    CPC ...... F16G 11/12; B25B 25/00; A44B 11/125; B60P 3/079; B60P 7/083; Y10T 24/2175; Y10T 24/2177; Y10T 24/2121

USPC ............ 24/68 CD, 68 D, 68 CT, 68 TT, 68 R, 24/265 CD; 254/231–234; 294/134; 403/43–46, 48

See application file for complete search history.

(56) References Cited

U.S. PATENT DOCUMENTS

| | | | |
|---|---|---|---|
| 519,263 A * | 5/1894 | Larkin | .......................... 254/231 |
| 925,448 A | 6/1909 | Boyden | |
| 3,044,811 A * | 7/1962 | Niskin | ............................ 403/78 |
| 3,350,057 A | 10/1967 | Luckenbill | |
| 3,501,817 A | 3/1970 | Bambenek et al. | |

(Continued)

OTHER PUBLICATIONS

International Search Report dated Apr. 19, 2013; 4 pgs.

*Primary Examiner* — Robert J Sandy
*Assistant Examiner* — Abigail Morrell
(74) *Attorney, Agent, or Firm* — Gifford, Krass, Sprinkle, Anderson & Citkowski, P.C.

(57) ABSTRACT

A tensioning device for tie down applications in a utility market that includes a drive end and a cable output end to attach to a medium, item, or truck or trailer. The tensioning device creates more tension in the medium than is generally able to be applied by hand with ratchet straps or chains, which provides a more secure tie down of items in a utility application. The tensioning device includes a drive system that can be driven with standard power tools or hand tools to retract a cable. The tensioning device may be designed with or without a clutch feature. The clutch feature allows for a desired cable tension to be reached for each installation and provides feedback to the operator when the correct tension is reached. The tensioning device includes an external bracket or hook for easily attaching to an item, medium, or truck or trailer.

26 Claims, 12 Drawing Sheets

(56) References Cited

U.S. PATENT DOCUMENTS

| | | |
|---|---|---|
| 4,131,264 A | 12/1978 | Patterson, III et al. |
| 4,157,171 A | 6/1979 | Hasselas |
| 4,617,703 A | 10/1986 | Schaeffer |
| 4,730,700 A | 3/1988 | Miller et al. |
| 4,936,416 A | 6/1990 | Garon |
| 5,515,943 A | 5/1996 | Antonelli |
| 5,702,196 A | 12/1997 | Petercsak |
| 6,223,511 B1 | 5/2001 | Brazeau |
| 6,354,176 B1 | 3/2002 | Nordlin |
| 6,722,472 B2 | 4/2004 | Berkbuegler |
| 6,866,120 B1 | 3/2005 | Butterworth |
| 6,902,342 B1 | 6/2005 | Ditzler |
| 7,377,361 B1 | 5/2008 | Tschida |
| 2006/0252292 A1 | 11/2006 | Sonderegger et al. |
| 2007/0041808 A1 | 2/2007 | Iwata et al. |

* cited by examiner

CABLE TENSIONING DEVICE

FIELD OF THE INVENTION

The present invention relates to tensioning devices, more particularly for devices used to tension a medium for use in utility markets, such as for tying down an off road vehicle on to a trailer.

BACKGROUND OF THE INVENTION

Tensioning devices for utility applications currently used in the industry are generally hand operated commonly available devices that may not create sufficient tension in a cable, chain, or strap to properly secure the item that the user wishes to tie down. Tensioning devices commonly known in the art vary in design and the choice of tensioning devices commonly available are susceptible to damage by road hazards, animals, sun and ultraviolet deterioration. In many cases, the person installing the tensioning device is not able to create enough tension in the device to safely tie down or secure an object on to a trailer or truck. It is commonly known that to properly secure an item, such as an off road vehicle, on to a trailer or truck, the suspension of the off road vehicle must be compressed to a position that does not allow the off road vehicle to come loose when subjected to accelerations caused by the road. Others use commercially available ratchet straps made of fibers that are susceptible to damage and stretch over time. Furthermore, ratchet straps are difficult to install by hand to safe tension for securing an item on a trailer, or for other utility applications.

There is therefore a need in the art for a tensioning device for utility applications that is easy to install and generates sufficient tension to properly secure an item to a trailer or on to a truck. The applications are many for such a tensioning device, and the application of securing an off road vehicle or snowmobile to a trailer or truck is just one example.

SUMMARY OF THE INVENTION

In one aspect there is disclosed a tensioning device for utility applications that includes a mechanism to provide tension in a cable utilizing a common drive feature and a threaded element.

More particularly, the threaded elements are disposed within a tube or housing wherein rotation of a threaded tube draws a cable into the tensioning device to create tension in a medium used in a utility application, such as holding an off road vehicle on to a trailer or truck.

The drive insert is attached to the end of a cable and is installed inside of a threaded tube. The drive insert may be located on the cable with clearance to the cable and an additional stop added to the cable to react against the drive insert, if desired. The drive insert may also include an area for crimping on to the cable.

The threaded tube is disposed within an outer tube. The outer tube does not rotate during installation and it provides an attachment point to a bracket or other medium for attaching to a point, such as a trailer when holding down an off road vehicle on to a trailer.

The outer tube may have a variety of designs for attachment. In one embodiment, a hook may be attached to or may be part of the outer tube or housing to provide the attachment to the medium or bracket.

The outer tube may be painted or otherwise coated for decorative purposes or for corrosion resistance. Soft coatings for noise dampening may also be used.

A drive member is installed at one end of the threaded tube to allow the threaded tube to be rotated inside the outer tube to draw the cable in. In one aspect, the drive member may be rigidly attached to the threaded tube to drive it rotationally. In another aspect, the drive member may be installed in a manner that acts as a clutch to prevent overload of the cable and provide feedback to the person installing the tensioning device that it is installed to the proper cable tension.

The clutched drive member design may include one or more clutch pins to match with radiused geometry inside the end of the threaded tube and have a spring to provide force holding the one or more pins into the radiused geometry in the threaded tube. Those skilled in the art recognize that a variety of designs may be used to act as a clutch on the drive mechanism of the tensioning device.

The clutch may be designed in a manner that is asymmetrical to protect against over travel in the cable release direction. In one aspect, the geometry on the inside of the end of the threaded tube may have radiused geometry where one side of the radiused geometry is shallower than the other side, allowing the clutch pins to disengage the radiused geometry at a lower torque in the release direction.

A retaining ring may be used to retain the threaded tube and drive member into the outer tube to ensure the assembly remains together, even when the tensioning device is loosened causing the drive insert to contact the inside of the outer tube or housing at the cable exit end. In the design incorporating a clutch, the retaining ring may provide a stop for the drive member and clutch assembly to ensure that the components of the clutch stay engaged. Those skilled in the art recognize a variety of retainer designs may be used to accomplish this design purpose.

A cable bushing may be installed in the end of the outer tube opposite the drive member. The cable bushing provides support for the cable as it exits the tensioning device, as the exit direction of the cable may vary. In one aspect, the outer tube may be designed as a single piece and the geometry of the cable exit may be part of this single piece outer housing.

The cable bushing may be pressed or crimped into the outer tube to secure it in place and seal out water. The cable bushing may also be coated with a sealant or adhesive to assist in sealing the cable bushing to the tube. The cable bushing may also include an internal groove for the purpose of installing a seal, such as an o-ring, to seal the cable exit from contaminants.

The cable may include a cable hook to be attached to a chain or other medium to be used in a utility application. Those skilled in the art recognize that the cable hook may have many different designs and methods of attachment to the cable.

A thrust washer may be installed inside the outer tube to provide a smooth and flat surface for the threaded tube to rotate against while cable tension is increasing. A bearing with roller elements may also be used.

An insert for anti-rotation may be installed inside the threaded tube to prevent the drive insert from rotating as the threaded tube is rotated, thus retracting the cable and creating tension for installation of tensioning device in a utility application.

Those skilled in the art recognize that many designs may be used to accomplish these purposes and the above summary is for illustrative purposes of one embodiment of the invention.

DETAILED DESCRIPTION OF THE PREFERRED EMBODIMENTS

Referring to the Figures, there is shown embodiments of a tensioning device 10 for utility applications. The tensioning device 10 may include an outer tube 12 and a cable 14. The tensioning device 10 may also include a threaded tube 16 which rotates to retract the cable 14 to a desired tension.

As seen in FIGS. 1A-D, the threaded tube 16 may include threads 18 formed on an inner diameter of the threaded tube 16. The threaded tube 16 may also include unthreaded portions 20 formed on one or both ends of the threaded tube 16 to act as protection against over-travel of the tensioning device 10. In one aspect, the threaded tube 16 may include a radiused geometry 22 on the end proximate a drive member 24.

The outer tube may have a variety of designs for attachment. In one embodiment, a hook 13 may be attached to or may be part of the outer tube or housing to provide the attachment to the medium or bracket.

The cable 14 may include an attachment structure such as a cable hook 26 to attach the tensioning device 10 to a medium or an item to be tied down. The cable hook 26 may be crimped or cast on to the cable 14. Those skilled in the art recognize a variety of hook designs may be used to accomplish this attachment. In one aspect the cable hook 26 may include a retention feature 99 for ensuring that the cable hook 26 does not come loose from the medium.

A drive insert 28 may be attached to the end of the cable 14 opposite the cable hook 26. The drive insert 28 may be threaded 18 to match the threads 18 of the threaded tube 16. The drive insert 28 may have one or more holes 29 formed therein allowing passage of an anti-rotation member 30. The drive insert 28 may also include a reduced diameter section 32 to allow for crimping to the cable 14.

Thrust washers 34 may be positioned so that the threaded tube 16 may have a bearing surface to rotate against that is smooth and flat. The thrust washers 34 may include geometry for clearance of the anti-rotation member 30 relative to the thrust washer 34. Those skilled in the art recognize that a ball or roller bearing may be installed in place of the thrust washers 34.

A retaining ring 36 may be installed within the outer tube 12 adjacent the thrust washer 34 to prevent the threaded tube 16 from translating inside the outer tube 12 as cable tension is increased.

As stated above, anti-rotation members 30 may be installed within the outer tube 12 either by press fit or some other method to prevent the drive insert 28 from rotating as the threaded tube 16 is rotated. The anti-rotation members 30 may be positioned inside the threaded tube 16 and include extensions which pass through holes 29 in the drive insert 28. In one aspect, the anti-rotation members 30 may include three members; however, those skilled in the art recognize that a variety of designs would function to prevent rotation of the drive insert 28.

A drive member 24 may be used to rotate the threaded tube 16 using a cordless drill or other hand tools. In one aspect, the drive member 24 may include an external hexagonal structure 38 to rotate the threaded tube 16. Those skilled in the art recognize that a variety of shapes and configurations may be used as a drive feature to rotate the threaded tube 16 for operation of the tensioning device 10.

A drive member 24 may be rotated by hand or power tools. When rotated, the drive member 24 may rotate the threaded tube 16. As the threaded tube 16 is rotated, the threads 18 on the inside of the threaded tube 16 engage the external threads 27 on the drive insert 28. The drive insert 28 is restricted from rotation by the anti-rotation members 30, allowing the drive insert to move upward on the threads 18 of the threaded tube 16 toward the drive member 24 and retracting the cable 14 and creating tension.

In one aspect, the drive member 24 may be directly and rigidly attached to the threaded tube 16 allowing the threaded tube 16 to be rotated to retract the cable 14 and provide tension. In another aspect, the drive member 24 may be integral with the threaded tube 16 as one component.

A cable bushing 97 may be installed in the end of the outer tube 12 opposite the drive member 24. The cable bushing 97 provides support for the cable 14 as it exits the tensioning device, as the exit direction of the cable may vary. In one aspect, the outer tube 12 may be designed as a single piece and the geometry, such as a radiused internal geometry 98 of the cable exit may be part of this single piece outer housing. The cable bushing 97 may be pressed or crimped into the outer tube 12 to secure it in place and seal out water. The cable bushing 97 may also be coated with a sealant or adhesive to assist in sealing the cable bushing 97 to the tube 12. The cable bushing 97 may also include an internal groove for the purpose of installing a seal, such as an o-ring, to seal the cable exit from contaminants.

Figure 1A:
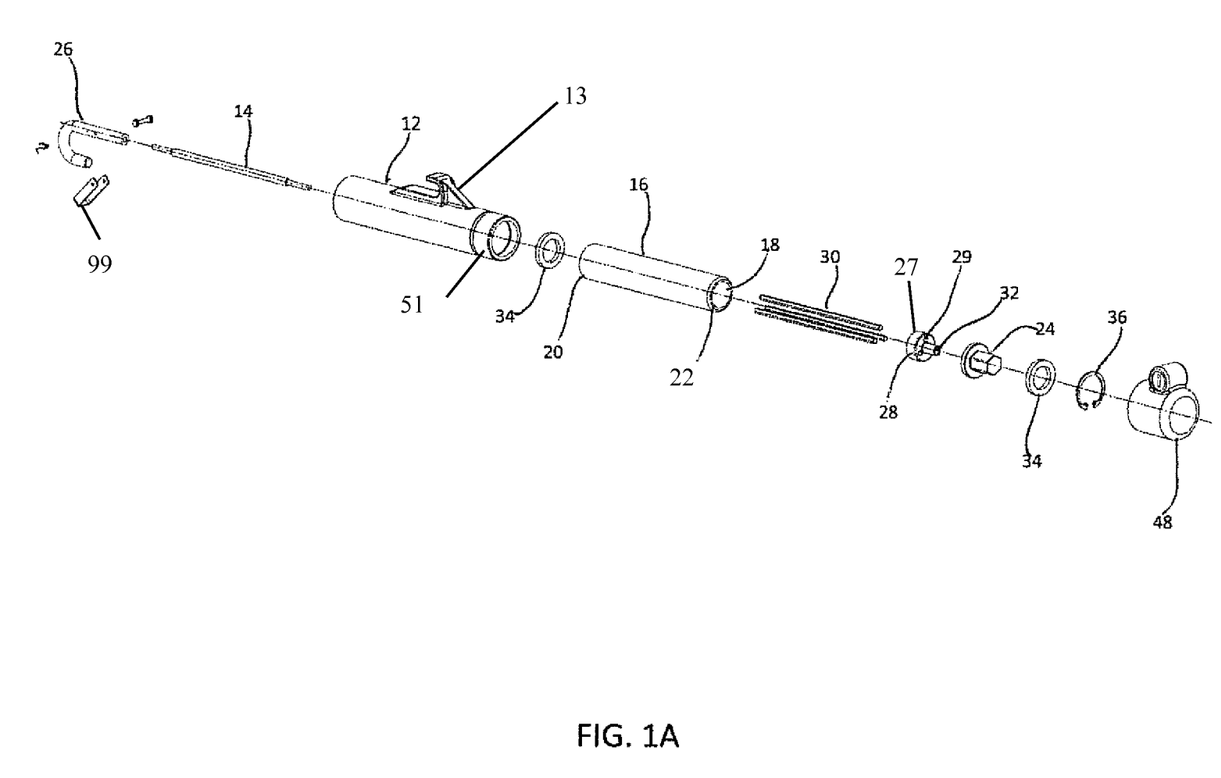
FIG. 1A is an exploded isometric view of one embodiment of a tensioning device for utility applications.
Figure 1B:
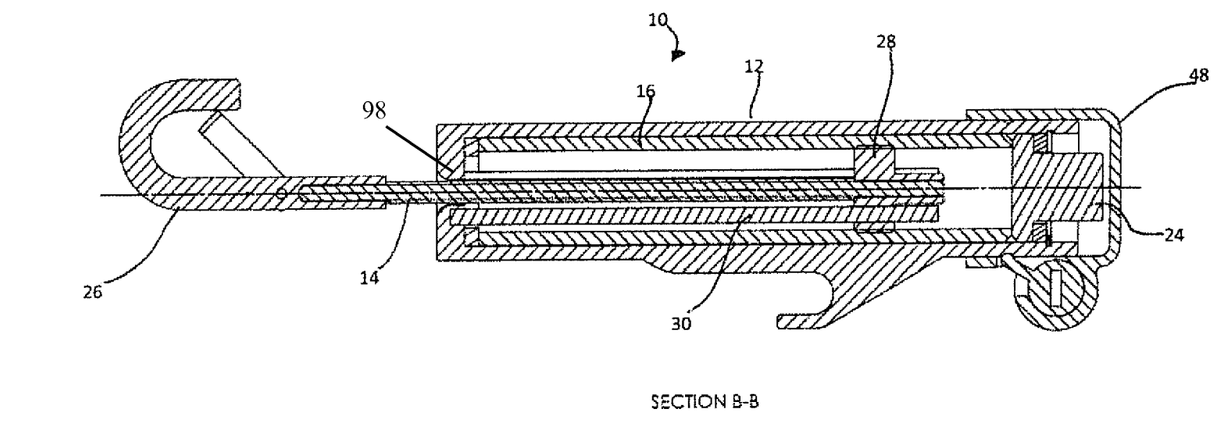
FIG. 1B is a top and sectional view of one embodiment of a tensioning device for utility applications.
Figure 1C:
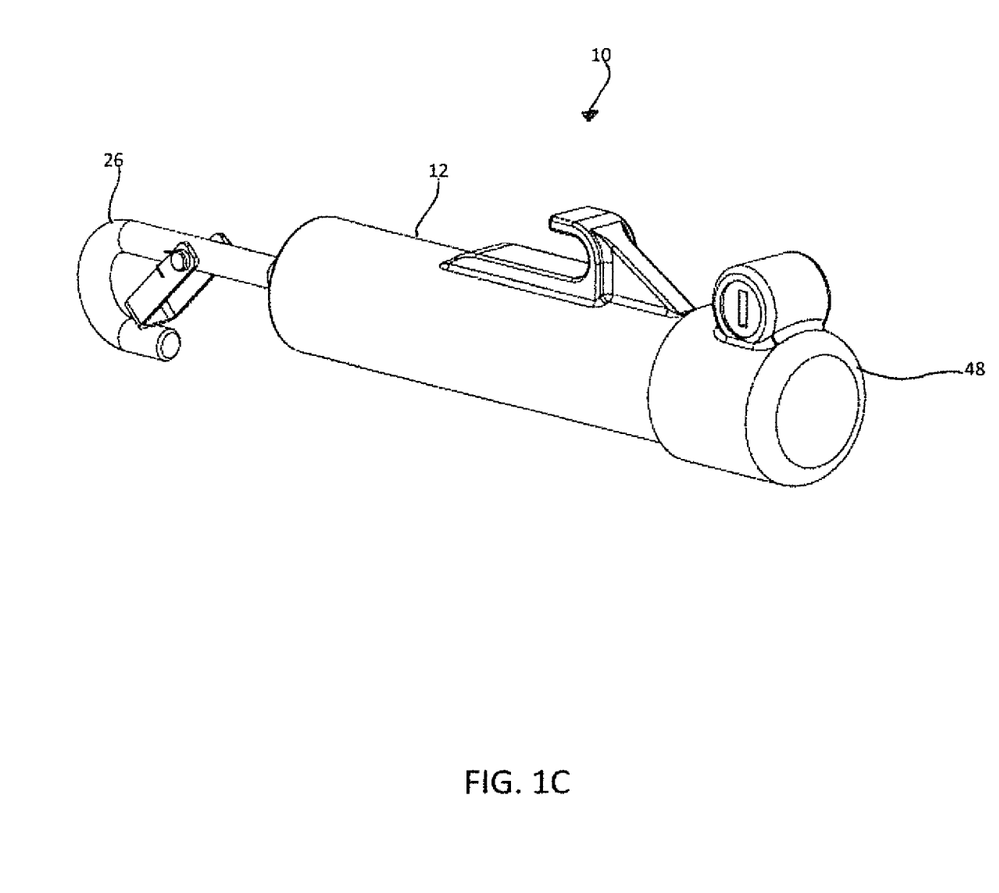
FIG. 1C is an isometric view of one embodiment of a tensioning device for utility applications.
Figure 1D:
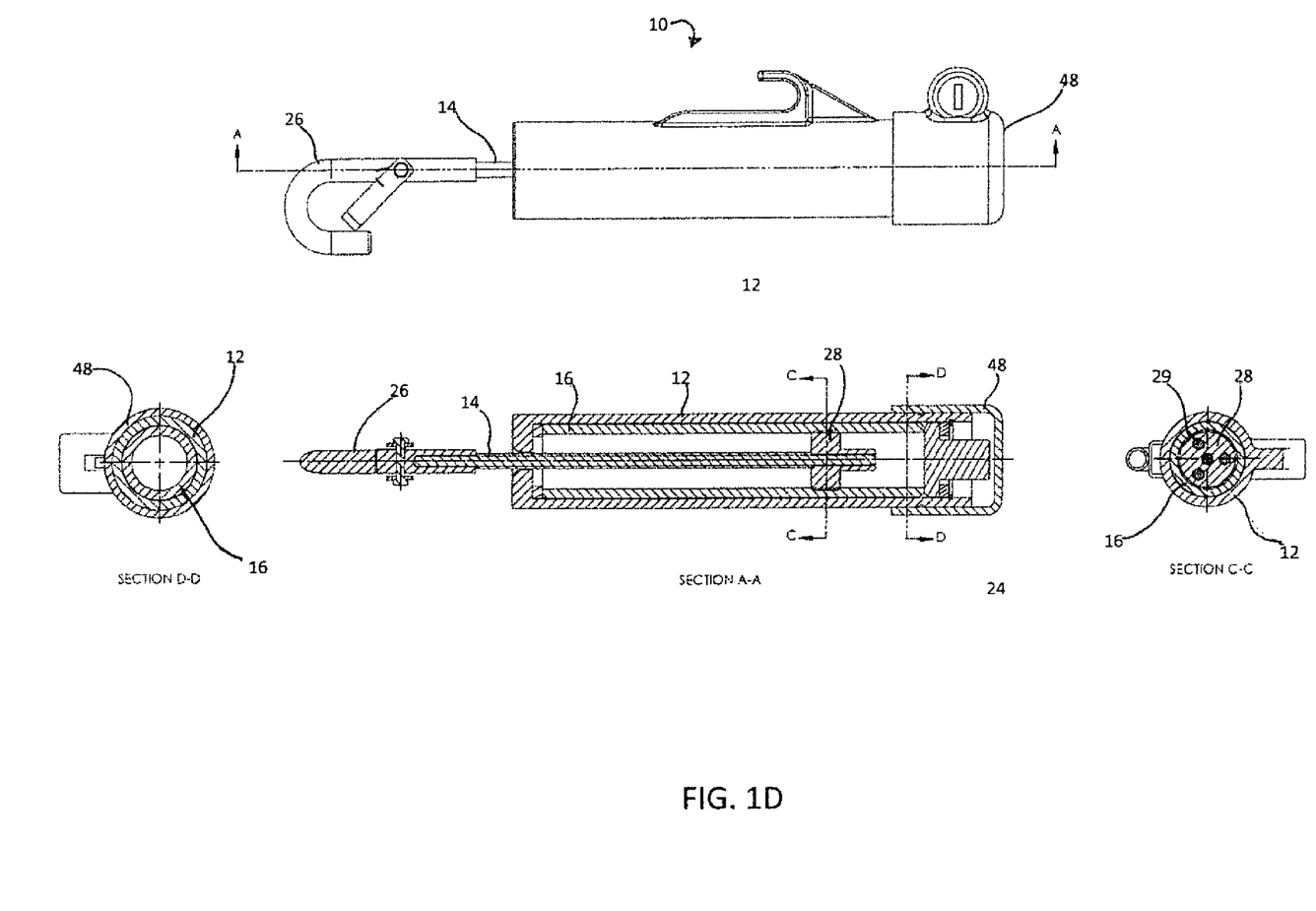
FIG. 1D is a side and sectional view of one embodiment of a tensioning device for utility applications.
Figure 1E:
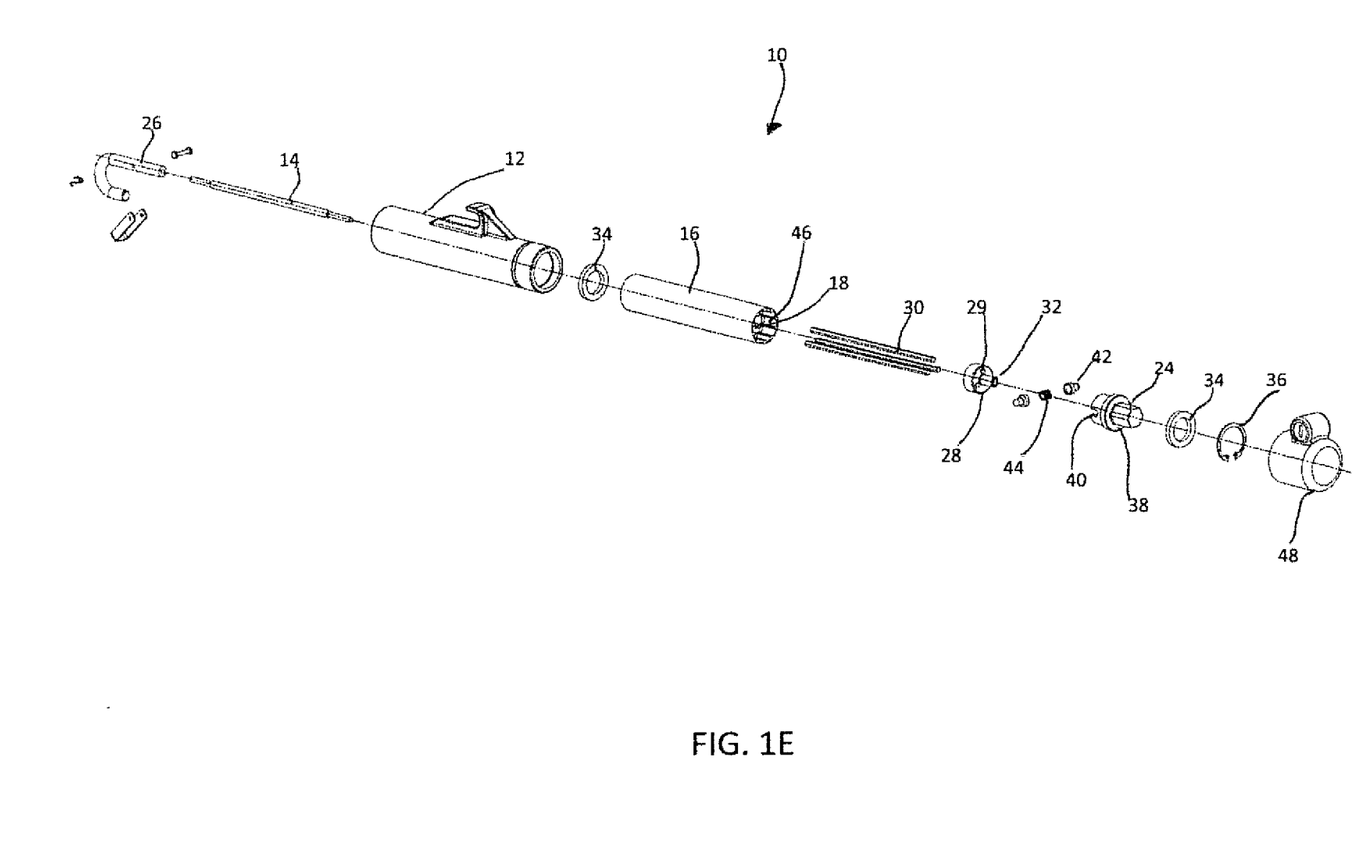
FIG. 1E is an exploded isometric view of one embodiment of a tensioning device including a clutch for utility applications.
Figure 1F:
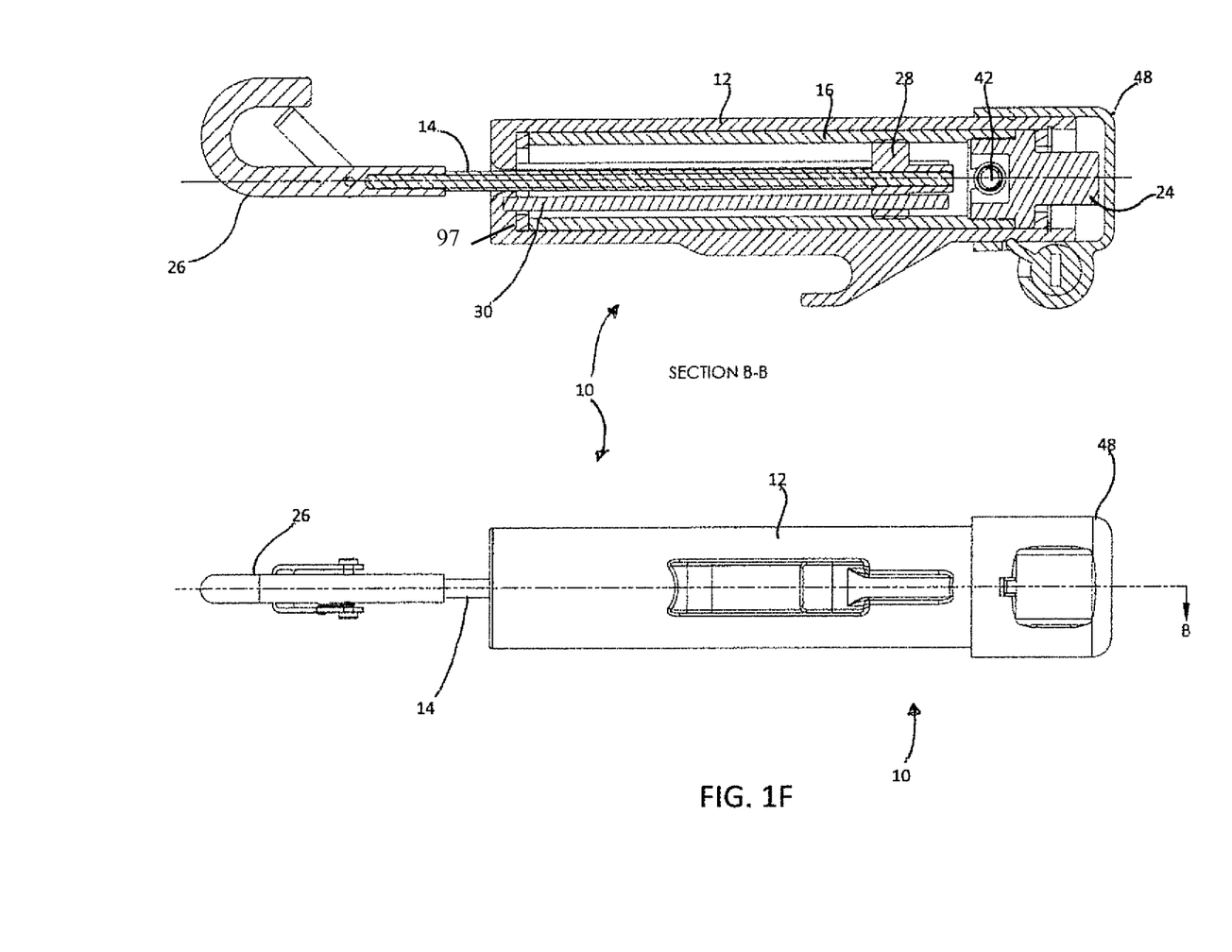
FIG. 1F is a top and sectional view of one embodiment of a tensioning device including a clutch for utility applications.
Figure 1G:
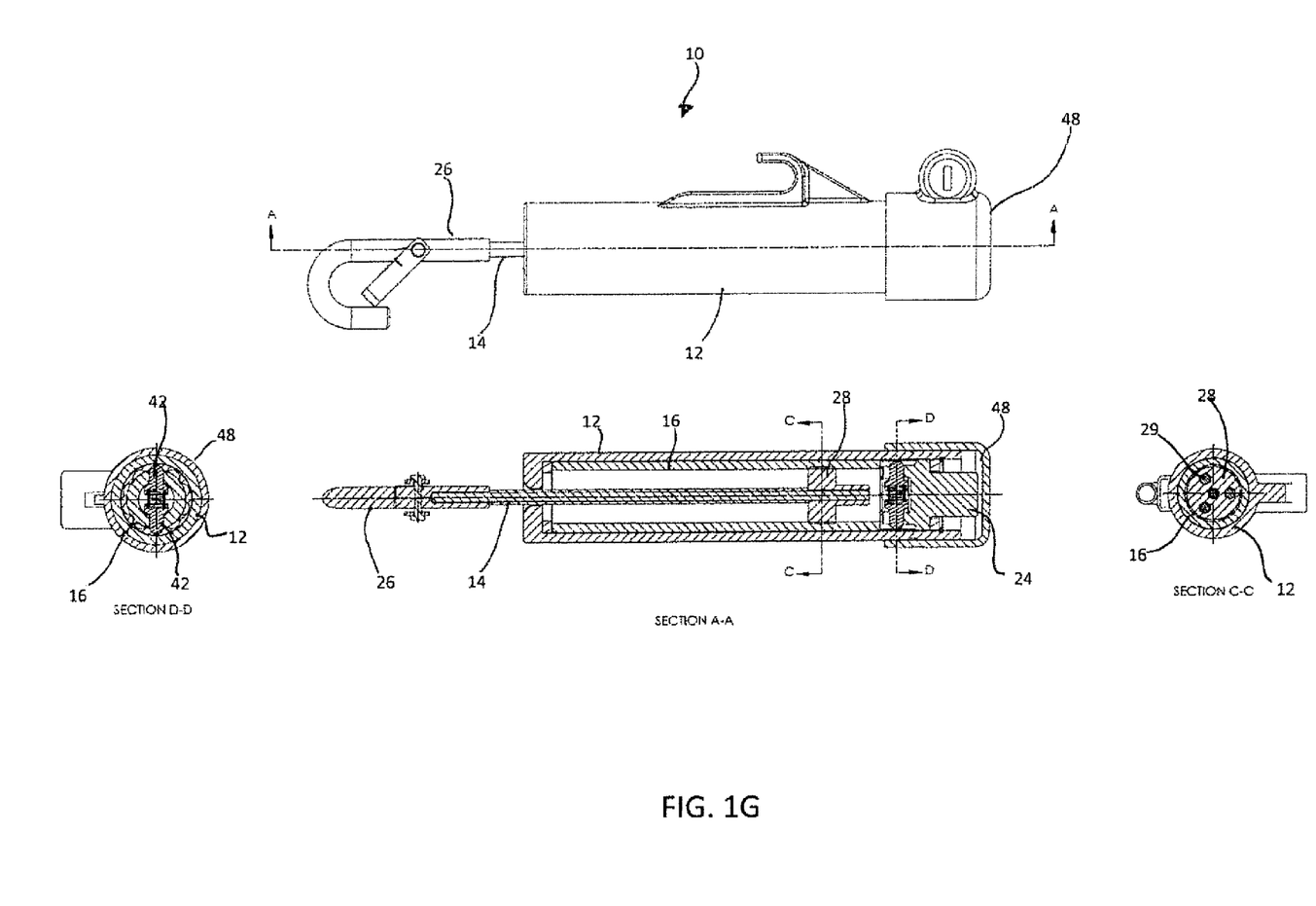
FIG. 1G is a side and sectional view of one embodiment of a tensioning device including a clutch for utility applications.

Alternatively, the drive member 24 may be coupled to the threaded tube 16 in a manner that allows slippage when proper tension is reached thus acting as a clutch. As shown in FIGS. 1E-G, in this embodiment, the drive member 24 may include a slot 40 that receives clutch pins 42. The clutch pins 42 may pass through the slot 40 and be retained in the slot 40. The threaded tube 16 may include radiused slots 46 to accept the clutch pins 42. Those skilled in the art recognize that one or more pins 42 may be utilized.

A clutch spring 44 may be positioned between two clutch pins 42 inside the slot 40 of the drive member 24 to hold the clutch pin 42 into radiused slots 46 formed in the threaded tube 16 until the desired torque is obtained. The movement of the clutch pin 42 into and out of the radiused slots 46 of the threaded tube 16 may provide audible and/or tactile feedback that proper cable tension has been obtained.

The cable 14 force may be directly proportional to the input torque applied to the drive member 24 allowing for control of the cable tension. Various numbers and shapes of the clutch components such as the slots 46 and pins 42 can be controlled based on the design of the clutch and threaded elements. Those skilled in the art will recognize that various designs may be utilized to allow slippage in the mechanism to prevent excessive cable 14 force.

Alternatively, the radiused slots 46 may have an asymmetrical design. In one aspect, the radiused slots 46 may have a geometry wherein the depth of the radiused slot 46 is less on one side than the other. The reduced depth of the radiused slot 46 on one side may allow the clutch pins 42 to overcome the clutch spring 44 and travel out of the radiused slot 46 at a lower torque in one direction. As illustrated, the clutch pins 42 may travel out of the radiused slots 46 in the direction where the tensioning device is extending the cable 14 to prevent the tensioning device 10 from becoming locked if it were over-released.

In one aspect, a locking cap 48 may be placed over the outer tube 12 and the drive member 24. The locking cap 48, when installed, prevents access to the drive member 24 so that the tensioning device 10 may not be loosened without removing the locking cap 48. The locking cap 48 may include a keyed actuator. When the locking cap 48 is installed over the outer tube 12 and drive member 24 it engages a locking groove 51 requiring actuation of a key tumbler to remove the locking cap 48 from the outer tube 12.

In another alternative embodiment shown in FIGS. 3-7, as with the embodiment disclosed in FIGS. 1E-G, the drive member 24 may be coupled to the threaded tube 16 in a manner that allows slippage when proper tension is reached thus acting as a clutch. In this embodiment, the drive member 24 may include a slot 40 that receives clutch pins 42. The clutch pins 42 may pass through the slot 40 and be retained in the slot 40. The threaded tube 16 may include radiused slots 46 to accept the clutch pins 42. Those skilled in the art recognize that one or more pins 42 may be utilized. In the depicted embodiment two clutch pins 42 are provided and are spaced and positioned relative to each other by a pin 43.

A clutch spring 44 may be positioned about the pin 43 and between two clutch pins 42 inside the slot 40 of the drive member 24 to hold the clutch pins 42 into radiused slots 46 formed in the threaded tube 16 until the desired torque is obtained. The movement of the clutch pin 42 into and out of the radiused slots 46 of the threaded tube 16 may provide audible and/or tactile feedback that proper cable tension has been obtained.

The cable 14 force may be directly proportional to the input torque applied to the drive member 24 allowing for control of the cable tension. Various numbers and shapes of the clutch components such as the slots 46 and pins 42 can be controlled based on the design of the clutch and threaded elements. Those skilled in the art will recognize that various designs may be utilized to allow slippage in the mechanism to prevent excessive cable 14 force.

Alternatively, the radiused slots 46 may have an asymmetrical design. In one aspect, the radiused slots 46 may have a geometry wherein the depth of the radiused slot 46 is less on one side than the other. The reduced depth of the radiused slot 46 on one side may allow the clutch pins 42 to overcome the clutch spring 44 and travel out of the radiused slot 46 at a lower torque in one direction. As illustrated, the clutch pins 42 may travel out of the radiused slots 46 in the direction where the tensioning device is extending the cable 14 to prevent the tensioning device 10 from becoming locked if it were over-released.

Again referring to FIGS. 3-7 the anti-rotation members 30 previously described above may have another shape and structure. In the depicted embodiment, the anti-rotation member 30 may be a hexagonal tube 50 or alternatively could be square, triangle, octagon, etc that may be installed within the outer tube 12 either by welding, gluing or otherwise attaching to prevent the drive insert 28 from rotating as the threaded tube 16 is rotated. In one aspect, the hexagonal tube 50 includes slots 55 formed longitudinally along a portion of its length to allow connection of the drive insert 28 with the cable 14 and to allow the drive insert 28 to travel about the hexagonal tube 50 within the threaded tube 16.

The drive insert 28 in the depicted embodiment of FIGS. 3-7 includes an annular body 57 that may be attached to the end of the cable 14 opposite the cable hook 26. The drive insert 28 may be threaded on an outer surface to match the threads 18 of the threaded tube 16. The drive insert 28 may have a slot 59 formed therein that corresponds to the hexagonal tube 50. Additionally the drive insert 28 may include an axial slot 61 that passes through the annular body 57. A pin 63 may pass through the axial slot 61 attaching the cable 14 to the drive insert 28. In one aspect, the cable 14 is connected to a cable interface 65. The cable interface 65 includes an axial slot 67 such that when assembled the pin 63 passes through the axial slot 61 of the drive insert 28 and the axial slot 67 of the interface 65 thereby joining the components.

Thrust washers 34 may be positioned so that the threaded tube 16 may have a bearing surface to rotate against that is smooth and flat. Those skilled in the art recognize that a ball or roller bearing may be installed in place of the thrust washers 34.

A spacer 69 may be positioned between the drive insert 28 and clutch pins 42. In this manner an axial load is not applied to the clutch pins 42 and spring 44 when the tensioning device 10 is actuated to release a load from the tensioning device 10.

Figure 2:
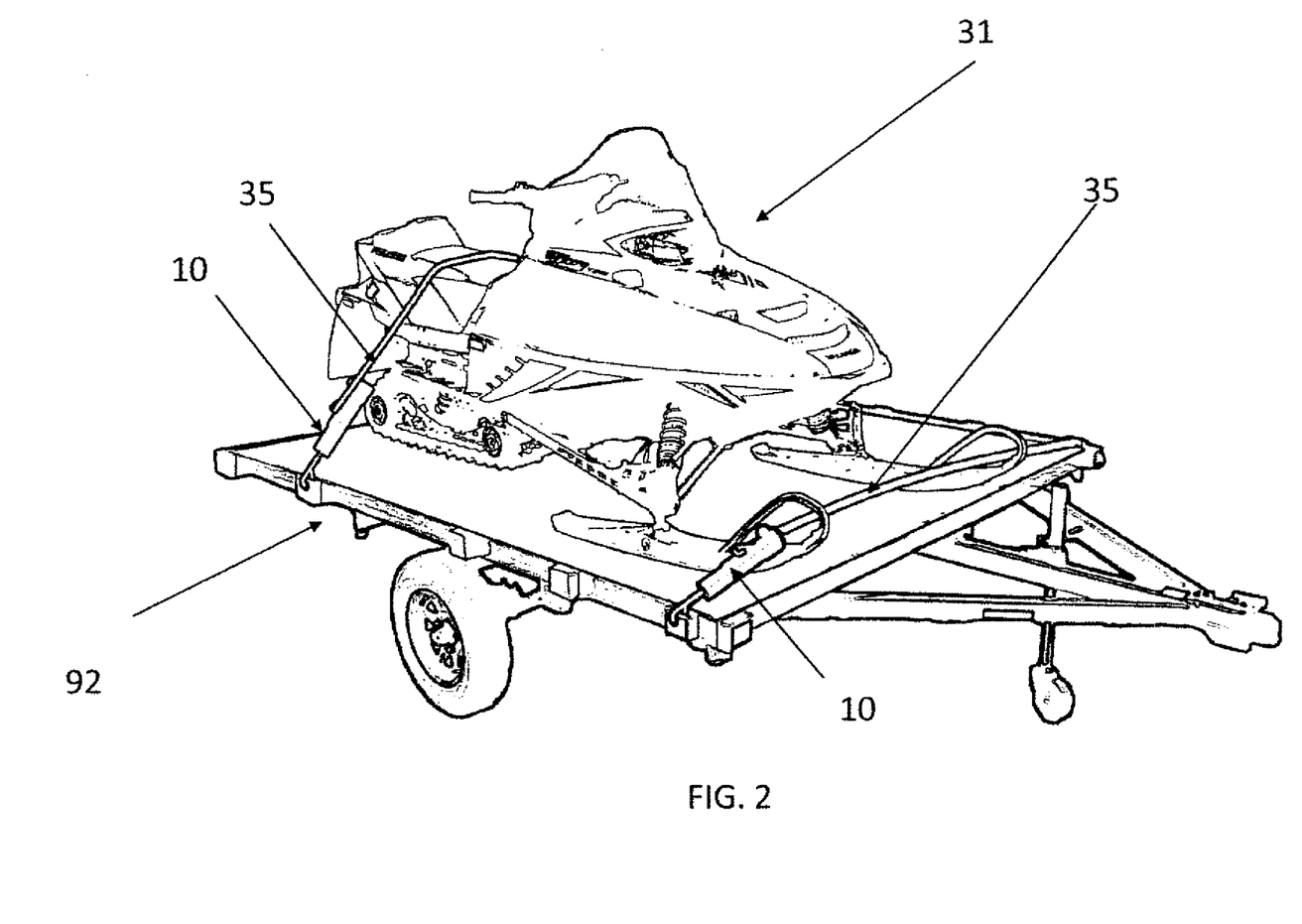
FIG. 2 is an assembled view illustrating the placement of a tensioning device on a trailer for holding down an off road vehicle.
Figures 3, 4:
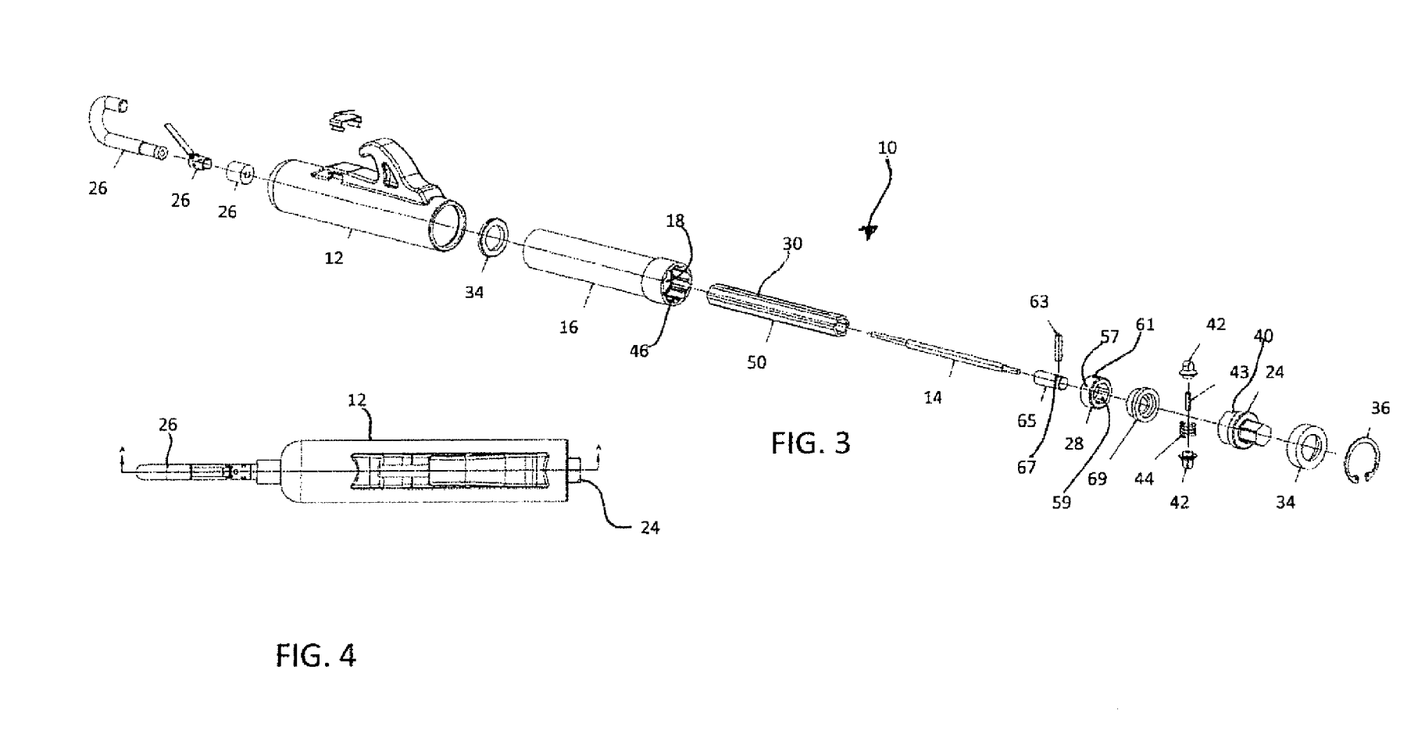
FIG. 3 is a perspective view of another embodiment including a center hex and clutch for utility applications.
FIG. 4 is a top view of the embodiment of FIG. 3.
Figure 5:
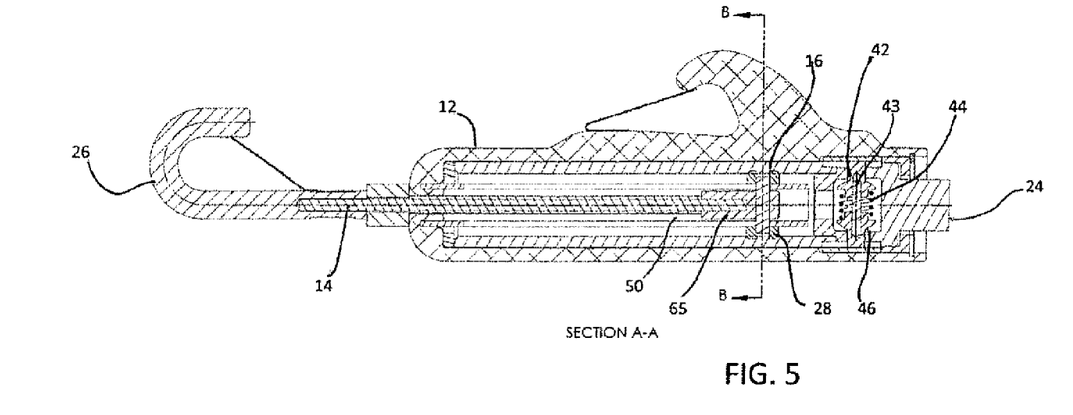
FIG. 5 is a sectional view along the line A-A of FIG. 4.
Figure 6:
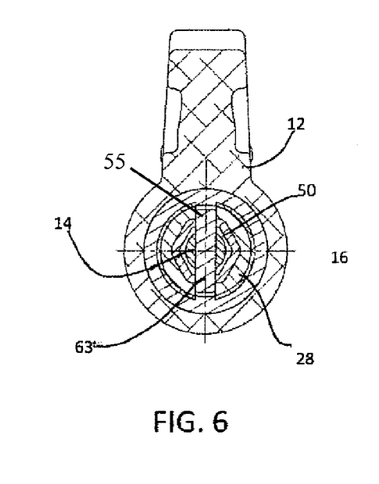
FIG. 6 is a sectional view along the line B-B of FIG. 5.
Figure 7:
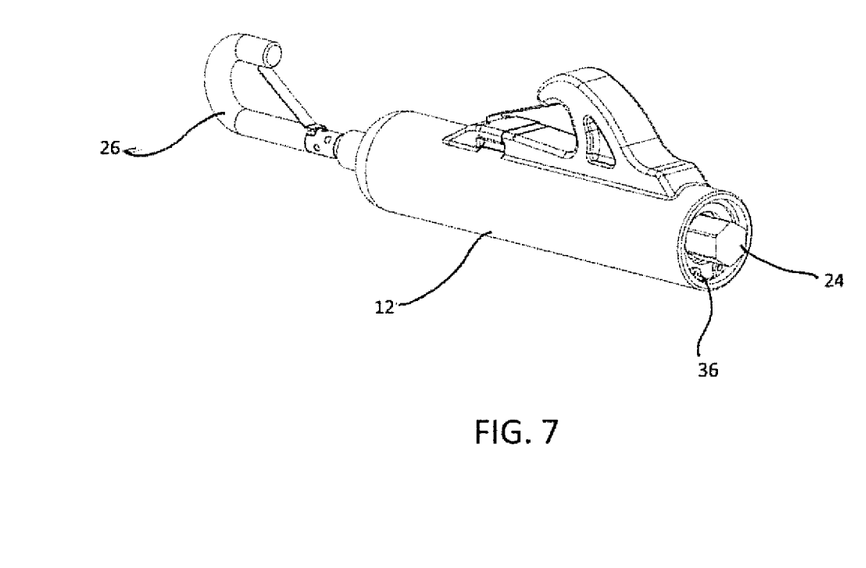
FIG. 7 is a perspective view of the embodiment of FIG. 3 assembled.
Figure 8:
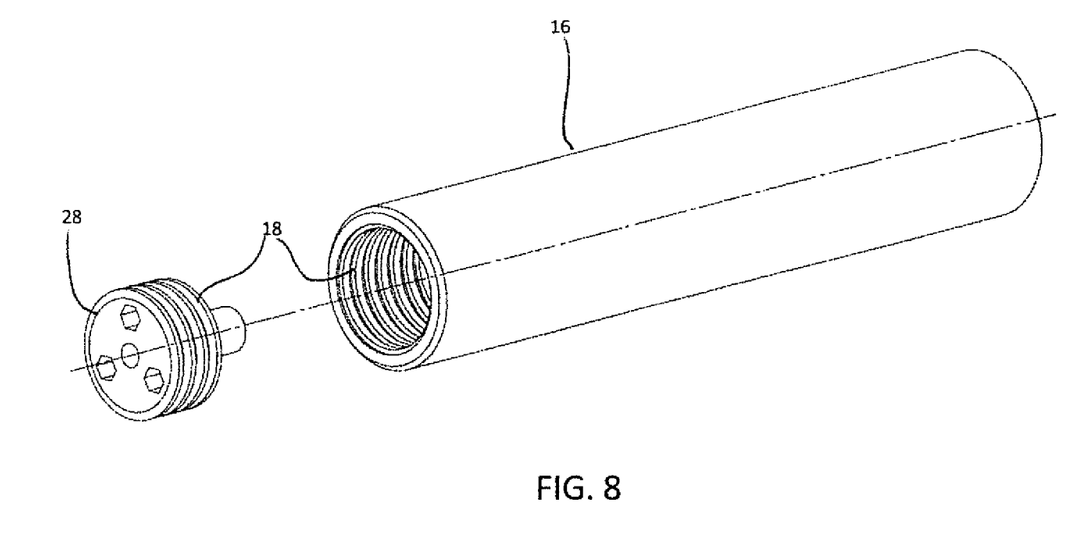
FIG. 8 is a perspective view of the threaded tube and drive insert showing threads.

Referring to FIG. 2, there is shown the cable tensioning device 10 for holding down an off road vehicle 31 to a trailer 32 or truck bed. The tensioning device 10 is attached to a medium, such as a chain or strap 35. The chain or strap 35 may be attached to the off road vehicle 31 on one end or to the trailer 32. The other end of the tensioning device 10 may be attached to the trailer 32 or to a chain or strap 35 that is attached to the off road vehicle 31.

For safe attachment of an off road vehicle 31 to a trailer 32, the suspension of the off road vehicle 31 must be compressed far enough that vertical and horizontal accelerations due to towing the trailer 32 on a road or trail will not cause the off road vehicle 31 to bounce far enough to loosen the straps or chains 35.

When the tensioning device 10 is actuated and the cable 14 is drawn into the device, the tension in the chain 35 is increased to compress the off road vehicle 31 suspension sufficiently to secure it to the trailer 32.

The invention has been described in an illustrative manner. It is to be understood that the terminology, which has been used, is intended to be in the nature of words of description rather than limitation. Many modifications and variations of the invention are possible in light of the above teachings. Therefore, within the scope of the appended claims, the invention may be practiced other than as specifically described.

The invention claimed is:

1. A tensioning device for tying down items in a utility application comprising:
   an outer tube;
   a threaded tube having threads formed on an inner diameter of the tube, the threaded tube positioned within the outer tube;

a drive insert positioned within the threaded tube, the drive insert including threads formed thereon that mate with the threads formed on the threaded tube, a cable attached to the drive insert at one end of the cable and including an attachment structure for attaching to a desired medium at an opposing end of the cable;

a drive member coupled to the drive insert, the drive member rotating the threaded tube and tensioning the cable;

one or more anti-rotation inserts disposed within the threaded tube, said one or more anti rotation inserts preventing rotation of the drive insert as the threaded tube is rotated.

2. The device of claim 1, wherein the drive member is connected to the threaded tube and wherein rotation of the threaded tube corresponds to movement of the drive insert within the threaded tube.

3. The device of claim 1, including a hook attached to the outer tube for attachment to the medium.

4. The device of claim 1, including a cable bushing positioned at an end of the outer tube, the cable bushing having a radiused internal geometry designed to support the cable and minimize cable wear when the cable exits at an angle.

5. The device of claim 1, wherein the outer tube includes a radiused internal geometry at a cable exit designed to support the cable and minimize cable wear when the cable exits at an angle.

6. The device of claim 1, wherein the attachment structure includes a hook attached to the opposing end of the cable for attachment to the medium.

7. The device of claim 6, wherein the hook includes a retention feature for ensuring that the hook does not come loose from the medium.

8. The device of claim 1, including a retaining ring and thrust washer positioned at an end of the threaded tube retaining the threaded tube within the outer tube.

9. The device of claim 1, wherein the threaded tube and outer tube are non-circular in shape.

10. The device of claim 1, wherein the one or more anti-rotation inserts includes a hexagonal tube disposed and attached within the threaded tube, the hexagonal tube including slots formed longitudinally along a portion of its length.

11. The device of claim 10, wherein the drive insert includes an annular body having a slot corresponding to the hexagonal tube and an axial slot formed there through.

12. The device of claim 11, including a cable interface attached to the cable, the cable interface including an axial slot formed therein.

13. The device of claim 12, including a pin passing through the axial slot of the cable interface and the axial slot of the drive insert connecting the cable to the drive insert.

14. A tensioning device for tying down items in a utility application comprising:
an outer tube;
a threaded tube having threads formed on an inner diameter of the tube, the threaded tube positioned within the outer tube;
a drive insert positioned within the threaded tube, the drive insert including threads formed thereon that mate with the threads formed on the threaded tube,
a cable attached to the drive insert at one end of the cable and including an attachment structure for attaching to a desired medium at an opposing end of the cable;
a drive member coupled to the drive insert, the drive member rotating the threaded tube and tensioning the cable;
one or more anti-rotation inserts disposed within the threaded tube, said one or more anti rotation inserts preventing rotation of the drive insert as the threaded tube is rotated;
a clutch mechanism attached between the drive member and the threaded tube, the clutch mechanism slipping and preventing transfer of torque from the drive member to the threaded tube when a desired cable tension is achieved.

15. The device of claim 14, wherein the drive member is connected to the threaded tube and wherein rotation of the threaded tube corresponds to movement of the drive insert within the threaded tube.

16. The device of claim 14, wherein the threaded tube includes radiused slots formed on an inner surface of the tube, the radiused slots positioned on a drive end of the threaded tube.

17. The device of claim 14, wherein the clutch mechanism includes one or more clutch pins attached to the drive member, the clutch pins extending radially relative to the drive member.

18. The device of claim 17, wherein the clutch mechanism includes one or more springs contacting the clutch pins, the one or more springs imparting an outward force on the clutch pins for engaging the clutch pins with radiused slots formed on the threaded tube.

19. The device of claim 14, including a retaining ring and washer positioned at an end of the threaded tube retaining the threaded tube within the outer tube.

20. The device of claim 14, wherein the one or more anti rotation inserts includes a hexagonal tube disposed and attached within the threaded tube, the hexagonal tube including slots formed longitudinally along a portion of its length.

21. The device of claim 20, wherein the drive insert includes an annular body having a slot corresponding to the hexagonal tube and an axial slot formed there through.

22. The device of claim 21, including a cable interface attached to the cable, the cable interface including an axial slot formed therein.

23. The device of claim 22, including a pin passing through the axial slot of the cable interface and the axial slot of the drive insert connecting the cable to the drive insert.

24. The device of claim 20 including a spacer positioned between the drive insert and clutch pins of the clutch mechanism.

25. The device of claim 14 including a locking cap positioned about the drive member and engaging the outer tube for preventing access to the drive member.

26. A tensioning device for tying down items in a utility application comprising:
an outer tube;
a threaded tube having threads formed on an inner diameter of the tube, the threaded tube positioned within the outer tube;
a drive insert positioned within the threaded tube, the drive insert including threads formed thereon that mate with the threads formed on the threaded tube,
a cable attached to the drive insert at one end of the cable and including an attachment structure for attaching to a desired medium at an opposing end of the cable;
a drive member connected to the threaded tube and wherein rotation of the threaded tube corresponds to movement of the drive insert within the threaded tube tensioning the cable;

one or more anti-rotation inserts disposed within the threaded tube, said one or more anti rotation inserts preventing rotation of the drive insert as the threaded tube is rotated;

a clutch mechanism attached between the drive member and the threaded tube, the clutch mechanism slipping and preventing transfer of torque from the drive member to the threaded tube when a desired cable tension is achieved.

* * * * *